(12) United States Patent
Oshimo

(10) Patent No.: US 10,245,888 B2
(45) Date of Patent: Apr. 2, 2019

(54) RUBBER COMPOSITION FOR TIRES AND PNEUMATIC TIRE

(71) Applicant: SUMITOMO RUBBER INDUSTRIES, LTD., Kobe-shi, Hyogo (JP)

(72) Inventor: Masaki Oshimo, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/882,012

(22) Filed: Jan. 29, 2018

(65) Prior Publication Data

US 2018/0229551 A1    Aug. 16, 2018

(30) Foreign Application Priority Data

Feb. 13, 2017   (JP) ................. 2017-023990

(51) Int. Cl.
| | |
|---|---|
| B60C 1/00 | (2006.01) |
| C08K 3/36 | (2006.01) |
| C08L 9/00 | (2006.01) |
| C08L 9/06 | (2006.01) |
| C08L 47/00 | (2006.01) |
| C08F 222/10 | (2006.01) |
| C08F 236/06 | (2006.01) |
| C08F 236/10 | (2006.01) |

(52) U.S. Cl.
CPC ............. *B60C 1/0016* (2013.01); *B60C 1/00* (2013.01); *C08F 222/10* (2013.01); *C08F 236/06* (2013.01); *C08F 236/10* (2013.01); *C08K 3/36* (2013.01); *C08L 9/00* (2013.01); *C08L 9/06* (2013.01); *C08L 47/00* (2013.01); *C08L 2207/53* (2013.01)

(58) Field of Classification Search
CPC ........................ C08L 2207/53; C08F 279/02
See application file for complete search history.

(56) References Cited

U.S. PATENT DOCUMENTS

| | | | | |
|---|---|---|---|---|
| 5,237,015 | A * | 8/1993 | Urban | B60C 1/0016 525/316 |
| 6,380,269 | B1 * | 4/2002 | Benko | B60C 1/0016 152/209.4 |
| 6,956,084 | B2 * | 10/2005 | Wang | B60C 1/00 525/313 |
| 7,638,574 | B2 * | 12/2009 | Zhang | B60C 1/0016 524/495 |
| 2006/0116473 | A1 * | 6/2006 | Castner | C08F 279/02 525/71 |
| 2009/0306246 | A1 * | 12/2009 | Gervat | C08L 23/02 523/201 |
| 2011/0236686 | A1 * | 9/2011 | Kitano | B01J 13/18 428/402 |
| 2016/0194427 | A1 * | 7/2016 | Kim | C08L 21/00 524/521 |

FOREIGN PATENT DOCUMENTS

| | | | | |
|---|---|---|---|---|
| JP | 2007-308625 A | | 11/2007 | |
| WO | WO-2010078320 A2 * | | 7/2010 | ........... B60C 1/0016 |

* cited by examiner

*Primary Examiner* — Nicole M. Buie-Hatcher
(74) *Attorney, Agent, or Firm* — Birch, Stewart, Kolasch & Birch LLP

(57) ABSTRACT

Provided is a rubber composition for tires achieving a balanced improvement of fuel economy, abrasion resistance, and road noise-reducing properties. The present invention relates to a rubber composition for tires, containing a core-shell structured particle including a core and a shell, the core having a melt viscosity at 38° C. of 0.1 to 3,000 Pa·s, the shell being formed of a polymer of a conjugated diene compound and/or an aromatic vinyl compound.

10 Claims, No Drawings

RUBBER COMPOSITION FOR TIRES AND PNEUMATIC TIRE

TECHNICAL FIELD

The present invention relates to a rubber composition for tires and a pneumatic tire.

BACKGROUND ART

Rubber compositions for tires are required to be excellent in fuel economy and abrasion resistance; however, it is generally difficult to obtain both properties due to their trade-off relationship. Hence, techniques for a balanced improvement of fuel economy and abrasion resistance have been developed. Patent Literature 1 discloses one example of such techniques which involves incorporation of a core-shell structured particle including a core formed of melamine resin and a shell formed of silica.

The study of Patent Literature 1, however, is insufficient to improve road noise-reducing properties, as rubber compositions for tires are also required to be excellent in road noise-reducing properties, in addition to in fuel economy and abrasion resistance.

CITATION LIST

Patent Literature

Patent Literature 1: JP 2007-308625 A

SUMMARY OF INVENTION

Technical Problem

The present invention aims to solve the above problem and provide a rubber composition for tires achieving a balanced improvement of fuel economy, abrasion resistance, and road noise-reducing properties.

Solution to Problem

The present invention relates to a rubber composition for tires, containing a core-shell structured particle including a core and a shell, the core having a melt viscosity at 38° C. of 0.1 to 3,000 Pa·s, the shell being formed of a polymer of at least one of a conjugated diene compound or an aromatic vinyl compound.

Preferably, the core is formed of at least one selected from the group consisting of a polymer of a compound represented by the following formula (1), a copolymer of a conjugated diene compound and an aromatic vinyl compound, a copolymer of a conjugated diene compound and a compound of formula (1), a copolymer of an aromatic vinyl compound and a compound of formula (1), and a copolymer of a conjugated diene compound, an aromatic vinyl compound, and a compound of formula (1),

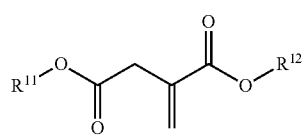

(1)

wherein $R^{11}$ and $R^{12}$ are the same or different and each represent a hydrogen atom or a C1-C30 hydrocarbon group.

The core-shell structured particle preferably includes, per 100% by mass thereof, 5% to 95% by mass of the core and 5% to 95% by mass of the shell.

The core-shell structured particle preferably has an average particle size of 100 to 10,000 nm.

The rubber composition for tires preferably contains, per 100 parts by mass of a rubber component therein, 1 to 50 parts by mass of the core-shell structured particle.

The rubber composition for tires preferably contains at least one of carbon black or silica.

The present invention also relates to a pneumatic tire, including a tire component formed from the rubber composition.

Advantageous Effects of Invention

The rubber composition for tires of the present invention contains a core-shell structured particle including a core and a shell, the core having a melt viscosity at 38° C. of 0.1 to 3,000 Pa·s, the shell being formed of a polymer of a conjugated diene compound and/or an aromatic vinyl compound. Such a rubber composition provides for a balanced improvement of fuel economy, abrasion resistance, and road noise-reducing properties.

DESCRIPTION OF EMBODIMENTS

The rubber composition for tires of the present invention contains a core-shell structured particle including a core and a shell. The core has a melt viscosity at 38° C. of 0.1 to 3,000 Pa·s. The shell is formed of a polymer of a conjugated diene compound and/or an aromatic vinyl compound.

The core-shell structured particle can be incorporated in a rubber composition to reduce tire vibration properties (loss coefficient η), thereby improving road noise-reducing properties.

A rubber composition containing a conventional core-shell structured particle may be too hard, causing a deterioration in fuel economy. In contrast, since the present core-shell structured particle includes a core having a low melt viscosity at 38° C. of 0.1 to 3,000 Pa·s (liquid at room temperature), a rubber composition containing the particle exhibits reduced changes in hardness, which can allow both fuel economy and road noise-reducing properties to be simultaneously achieved.

Furthermore, the core-shell structured particle also functions as a reinforcing agent. Thus, it can be incorporated in a rubber composition to improve abrasion resistance.

Examples of rubbers that can be used in the rubber component in the rubber composition of the present invention include diene rubbers such as natural rubber (NR), polyisoprene rubber (IR), polybutadiene rubber (BR), and styrene-butadiene rubber (SBR). These rubbers may be used alone, or two or more of these may be used in combination. Among these, SBR or BR is preferred because they provide good fuel economy, abrasion resistance, and road noise-reducing properties.

Any SBR or BR may be used including those commonly used in the tire industry.

For good fuel economy, abrasion resistance, and road noise-reducing properties, the amount of SBR based on 100% by mass of the rubber component is preferably 45% by mass or more, more preferably 65% by mass or more, but is preferably 95% by mass or less, more preferably 85% by mass or less.

For the same reason, the amount of BR based on 100% by mass of the rubber component is preferably 5% by mass or more, more preferably 15% by mass or more, but is preferably 55% by mass or less, more preferably 35% by mass or less.

The core-shell structured particle used in the present invention includes a core having a melt viscosity at 38° C. of 0.1 to 3,000 Pa·s and a shell formed of a polymer of a conjugated diene compound and/or an aromatic vinyl compound.

It is sufficient that the core of the core-shell structured particle be formed substantially of a compound having a melt viscosity at 38° C. of 0.1 to 3,000 Pa·s. The core may additionally contain other components as long as the effects of the present invention are not impaired. The same applies to the shell.

It is sufficient that the core-shell structured particle include at least a core and a shell. The core-shell structured particle may further include other regions (e.g. a region where the compound forming the core is in admixture with the compound forming the shell) as long as the effects of the present invention are not impaired.

The core preferably has a melt viscosity at 38° C. of 1 Pa·s or more, more preferably 5 Pa·s or more, in order to obtain a better road noise-reducing effect. The melt viscosity is also preferably 1,000 Pa·s or less, more preferably 100 Pa·s or less, in order to prevent the rubber composition from being too hard, and thus obtain good fuel economy.

The melt viscosity of the core is determined as described later in EXAMPLES.

The compound forming the core may be any compound having the predetermined melt viscosity, preferably a polymer or copolymer of at least one monomer component selected from the group consisting of conjugated diene compounds, aromatic vinyl compounds, and compounds represented by the following formula (1). The polymer or copolymer may be a single species or a combination of two or more species.

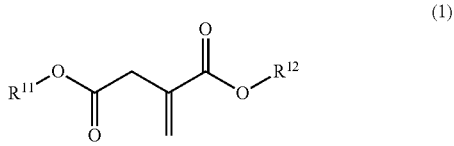

(1)

In formula (1), $R^{11}$ and $R^{12}$ are the same or different and each represent a hydrogen atom or a C1-C30 hydrocarbon group.

Examples of the conjugated diene compound which may be used as the monomer component for the core include 1,3-butadiene, isoprene, 1,3-pentadiene, 2,3-dimethyl-1,3-butadiene, 1,3-hexadiene, and myrcene. These compounds may be used alone, or two or more of these may be used in combination. Among these, 1,3-butadiene is preferred.

Examples of the aromatic vinyl compound which may be used as the monomer component for the core include styrene, α-methylstyrene, vinyltoluene, vinylnaphthalene, divinylbenzene, trivinylbenzene, and divinylnaphthalene. These compounds may be used alone, or two or more of these may be used in combination. Among these, styrene is preferred.

The hydrocarbon group for $R^{11}$ and $R^{12}$ in formula (1) may be linear, branched, or cyclic, and examples include aliphatic hydrocarbon groups, alicyclic hydrocarbon groups, and aromatic hydrocarbon groups, with aliphatic hydrocarbon groups being preferred. The hydrocarbon group preferably has 1 to 20 carbon atoms, more preferably 1 to 10 carbon atoms.

The aliphatic hydrocarbon group for $R^{11}$ and $R^{12}$ preferably has 1 to 20 carbon atoms, more preferably 1 to 10 carbon atoms, still more preferably 1 to 3 carbon atoms. Examples of the aliphatic hydrocarbon group include alkyl groups such as, specifically, methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Among these, a methyl or ethyl group is preferred, with an ethyl group being more preferred, because they contribute to a balanced improvement of fuel economy, abrasion resistance, and road noise-reducing properties.

The alicyclic hydrocarbon group preferably has 3 to 8 carbon atoms, and specific examples include cyclopropyl, cyclobutyl, cyclopentyl, cyclohexyl, cycloheptyl, cyclooctyl, cyclopropenyl, cyclobutenyl, cyclopentenyl, cyclohexenyl, cycloheptenyl, and cyclooctenyl groups.

The aromatic hydrocarbon group preferably has 6 to 10 carbon atoms, and specific examples include phenyl, benzyl, phenethyl, tolyl, xylyl, and naphthyl groups. The methyl substituent on the benzene ring of the tolyl or xylyl group may be located at any of the ortho, meta, or para positions.

Examples of the compound of formula (1) include itaconic acid, 1-methyl itaconate, 4-methyl itaconate, dimethyl itaconate, 1-ethyl itaconate, 4-ethyl itaconate, diethyl itaconate, 1-propyl itaconate, 4-propyl itaconate, dipropyl itaconate, 1-butyl itaconate, 4-butyl itaconate, dibutyl itaconate, and 1-ethyl-4-methyl itaconate. These compounds may be used alone, or two or more of these may be used in combination. Among these, diethyl itaconate, dibutyl itaconate, and 1-propyl itaconate are preferred, with diethyl itaconate being more preferred, because they contribute to a balanced improvement of fuel economy, abrasion resistance, and road noise-reducing properties.

For particularly good road noise-reducing properties, the core is preferably formed of at least one selected from the group consisting of a polymer of a compound of formula (1), a copolymer of a conjugated diene compound and an aromatic vinyl compound, a copolymer of a conjugated diene compound and a compound of formula (1), a copolymer of an aromatic vinyl compound and a compound of formula (1), and a copolymer of a conjugated diene compound, an aromatic vinyl compound, and a compound of formula (1), more preferably a copolymer of a conjugated diene compound and an aromatic vinyl compound or a polymer of a compound of formula (1), still more preferably a polymer of a compound of formula (1).

The NMR results suggest that the polymer of a compound of formula (1) forms intramolecular or intermolecular hydrogen bonds. It is therefore considered that the polymer produces a road noise-reducing effect as vibration energy is consumed to cleave or form these hydrogen bonds.

For good fuel economy, abrasion resistance, and road noise-reducing properties, the core of the core-shell structured particle preferably has an average particle size of 5 nm or more, more preferably 20 nm or more, but preferably 10,000 nm or less, more preferably 100 nm or less.

The average particle size of the core is a number average particle size measured using a transmission electron microscope.

For good fuel economy, abrasion resistance, and road noise-reducing properties, the amount of the core based on 100% by mass of the core-shell structured particle is preferably 5% by mass or more, more preferably 40% by mass or more, still more preferably 60% by mass or more, but is preferably 95% by mass or less, more preferably 85% by mass or less.

The shell of the core-shell structured particle is formed of a polymer of a conjugated diene compound and/or an aromatic vinyl compound. Examples of the conjugated diene compound and aromatic vinyl compound used as monomer components of the polymer and their suitable embodiments are as described for the core.

For good fuel economy, abrasion resistance, and road noise-reducing properties, the shell is preferably formed of a polymer of an aromatic vinyl compound, more preferably a polymer of styrene.

The shell is preferably solid at room temperature, i.e. it preferably has a melt viscosity at 38° C. of more than 3,000 Pa·s.

For good fuel economy, abrasion resistance, and road noise-reducing properties, the shell of the core-shell structured particle preferably has a thickness of 5 nm or more, more preferably 20 nm or more, but preferably 10,000 nm or less, more preferably 100 nm or less.

The thickness of the shell is calculated from the mass ratio of the monomers charged in the polymerization operation.

For good fuel economy, abrasion resistance, and road noise-reducing properties, the amount of the shell based on 100% by mass of the core-shell structured particle is preferably 5% by mass or more, more preferably 15% by mass or more, but is preferably 95% by mass or less, more preferably 60% by mass or less, still more preferably 40% by mass or less.

The core-shell structured particle preferably has an average particle size of 100 nm or more, more preferably 200 nm or more, in order to prevent the particle from aggregating and thus from initiating fracture. The average particle size is also preferably 10,000 nm or less, more preferably 3,000 nm or less, still more preferably 1,000 nm or less, in order to prevent the core-shell structured particle from initiating fracture, and thus obtain good abrasion resistance.

The average particle size of the core-shell structured particle is a number average particle size measured using a transmission electron microscope.

The amount of the core-shell structured particle per 100 parts by mass of the rubber component is preferably 1 part by mass or more, more preferably 5 parts by mass or more, still more preferably 10 parts by mass or more, in order to obtain good road noise-reducing properties. The amount is also preferably 50 parts by mass or less, more preferably 40 parts by mass or less, still more preferably 30 parts by mass or less, in order to obtain good fuel economy and abrasion resistance.

The rubber composition of the present invention preferably contains carbon black and/or silica, more preferably carbon black and silica, as a reinforcing agent.

Any carbon black or silica may be used including those commonly used in the tire industry.

The carbon black preferably has a nitrogen adsorption specific surface area ($N_2SA$) of 50 $m^2/g$ or more, more preferably 100 $m^2/g$ or more, to provide good reinforcing properties. For good fuel economy, the $N_2SA$ is preferably 180 $m^2/g$ or less, more preferably 150 $m^2/g$ or less.

The $N_2SA$ of carbon black is determined in accordance with JIS K 6217-2:2001.

For good fuel economy, abrasion resistance, and road noise-reducing properties, the amount of carbon black per 100 parts by mass of the rubber component is preferably 1 part by mass or more, more preferably 3 parts by mass or more, but is preferably 15 parts by mass or less, more preferably 10 parts by mass or less.

The silica preferably has a nitrogen adsorption specific surface area ($N_2SA$) of 100 $m^2/g$ or more, more preferably 150 $m^2/g$ or more, to provide good reinforcing properties. For good fuel economy, the $N_2SA$ is preferably 220 $m^2/g$ or less, more preferably 200 $m^2/g$ or less.

The $N_2SA$ of silica is determined by the BET method in accordance with ASTM D3037-8193.

For good fuel economy, abrasion resistance, and road noise-reducing properties, the amount of silica per 100 parts by mass of the rubber component is preferably 30 parts by mass or more, more preferably 50 parts by mass or more, but is preferably 120 parts by mass or less, more preferably 100 parts by mass or less.

The silica is preferably used together with a silane coupling agent. Examples of the silane coupling agent include sulfide silane coupling agents such as bis(3-triethoxysilylpropyl)tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone, or two or more of these may be used in combination. Among these, sulfide silane coupling agents are preferred, with bis(3-triethoxysilylpropyl)tetrasulfide being more preferred.

For good fuel economy, abrasion resistance, and road noise-reducing properties, the amount of the silane coupling agent per 100 parts by mass of silica is preferably 1 part by mass or more, more preferably 5 parts by mass or more, but is preferably 15 parts by mass or less, more preferably 10 parts by mass or less.

The rubber composition of the present invention may appropriately contain, in addition to the above-described components, compounding agents commonly used in the tire industry, such as waxes, antioxidants, zinc oxide, stearic acid, sulfur, vulcanization accelerators, and other materials.

The rubber composition of the present invention can be used for various tire components, particularly suitably for treads.

The pneumatic tire of the present invention can be formed from the above-described rubber composition by usual methods.

Specifically, the unvulcanized rubber composition incorporating components as described above is extruded and processed into the shape of a tire component such as a tread and then assembled with other tire components on a tire building machine in a usual manner to build an unvulcanized tire. The unvulcanized tire is heat pressed in a vulcanizer to produce a pneumatic tire of the present invention.

EXAMPLES

The present invention is specifically described with reference to examples, but is not limited thereto.

The chemicals used in examples and comparative examples are listed below.
SBR: SBR1502 available from JSR Corporation
BR: BR150B available from Ube Industries, Ltd.
Particles 1 to 4: the particles described below in the production examples and Table 1
Silica: ULTRASIL VN3 ($N_2SA$: 175 $m^2/g$) available from Evonik Degussa Carbon black: SHOBLACK N110 ($N_2SA$: 130 $m^2/g$) available from Cabot Japan K.K.

Oil: Diana Process AH-24 available from Idemitsu Kosan Co., Ltd.

Silane coupling agent: Si69 (bis(3-triethoxysilyl-propyl) tetrasulfide) available from Evonik Degussa Wax: SUNNOC N available from Ouchi Shinko Chemical Industrial Co., Ltd.

Antioxidant: OZONONE 6C (N-(1,3-dimethylbutyl)-N'-phenyl-p-phenylenediamine) available from Seiko Chemical Co., Ltd.

Zinc oxide: zinc oxide available from Mitsui Mining and Smelting Co., Ltd.

Stearic acid: stearic acid "TSUBAKI" available from NOF Corporation

Sulfur: sulfur powder available from Tsurumi Chemical Industry Co., Ltd.

Vulcanization accelerator: Nocceler NS (N-tert-butyl-2-benzothiazolylsulfenamide) available from Ouchi Shinko Chemical Industrial Co., Ltd.

(Preparation of Emulsifier)

An emulsifier was prepared by introducing 936 g of ion-exchanged water, 115 g of potassium rosinate soap, 33 g of fatty acid sodium soap, 5.1 g of potassium chloride, and 3.0 g of sodium naphthalenesulfonate-formaldehyde condensate into a vessel, followed by stirring at 70° C. for 2 hours.

Production Example 1: Production of Particle 1

A 3 L (interior volume) stainless steel polymerization reactor was cleaned, dried, and purged with dry nitrogen. Then, the reactor was charged with 600 g of styrene, 0.61 g of t-dodecyl mercaptan, 968 g of the emulsifier, 1.0 mL of sodium hydrosulfide, 1.0 mL each of the activators $FeSO_4$/EDTA/Rongalite, and 1.0 mL of a polymerization initiator (PERMENTA H available from NOF Corporation), followed by polymerization at 10° C. for one hour with stirring. After completion of the polymerization, 0.5 g of N,N-diethylhydroxylamine was added to the reaction mixture and they were reacted for 30 minutes. Then, the contents were taken out from the polymerization reactor and combined with 2.4 g of 2,6-di-t-butyl-p-cresol (Sumilizer BHT available from Sumitomo Chemical Co., Ltd.). Then, most of the water was evaporated off, and the residue was dried under reduced pressure at 55° C. for 12 hours to obtain a polymer (Particle 1).

Production Example 2: Production of Particle 2

Polymerization of core: A 3 L (interior volume) stainless steel polymerization reactor was cleaned, dried, and purged with dry nitrogen. Then, the reactor was charged with 450 g of 1,3-butadiene, 150 g of styrene, 0.61 g of t-dodecyl mercaptan, 968 g of the emulsifier, 1.0 mL of sodium hydrosulfide, 1.0 mL each of the activators $FeSO_4$/EDTA/Rongalite, and 1.0 mL of a polymerization initiator (PERMENTA H available from NOF Corporation), followed by polymerization at 10° C. for one hour with stirring.

Polymerization of shell: To the reaction product were added 0.3 mL of a polymerization initiator (PERMENTA H available from NOF Corporation), 150 g of styrene, and 0.3 mL of sodium hydrosulfide, followed by polymerization at 10° C. for one hour with stirring. After completion of the polymerization, 0.5 g of N,N-diethylhydroxylamine was added to the reaction mixture and they were reacted for 30 minutes. Then, the contents were taken out from the polymerization reactor and combined with 2.4 g of 2,6-di-t-butyl-p-cresol (Sumilizer BHT available from Sumitomo Chemical Co., Ltd.). Then, most of the water was evaporated off, and the residue was dried under reduced pressure at 55° C. for 12 hours to obtain a polymer (Particle 2).

Particle 2 had a core-shell structure whose core and shell were solid at room temperature.

Production Example 3: Production of Particle 3

A polymer (Particle 3) was prepared under the same conditions as in Production Example 2, except that 1.11 g of t-dodecylmercaptan was added in the polymerization of the core.

Particle 3 had a core-shell structure whose core and shell were liquid and solid, respectively, at room temperature.

Production Example 4: Production of Particle 4

A polymer (Particle 4) was prepared under the same conditions as in Production Example 2, except that diethyl itaconate was used as a monomer component instead of 1,3-butadiene and styrene in the polymerization of the core.

Particle 4 had a core-shell structure whose core and shell were liquid and solid, respectively, at room temperature.

(Melt Viscosity)

A small portion of the reaction product (core compound) obtained after completion of the polymerization of the core was taken as a sample. The melt viscosity of the sample was measured at 38° C. using a Brookfiled viscometer available from Brookfield Engineering Labs., Inc.

TABLE 1

| | | unit | Particle 1 | Particle 2 | Particle 3 | Particle 4 |
|---|---|---|---|---|---|---|
| Core | Styrene | % by mass | 100 | 25 | 25 | — |
| | Butadiene | % by mass | — | 75 | 75 | — |
| | Diethyl itaconate | % by mass | — | — | — | 100 |
| | Melt viscosity (38° C.) | Pa · s | — | (solid) | 10 | 8 |
| Shell | Styrene | % by mass | — | 100 | 100 | 100 |
| Core content | | % by mass | 100 | 80 | 80 | 80 |
| Shell content | | % by mass | — | 20 | 20 | 20 |
| Average particle size | | nm | 400 | 430 | 340 | 220 |

Examples and Comparative Examples

The materials other than the sulfur and vulcanization accelerator in the amounts indicated in Table 2 were put into a 1.7 L Banbury mixer available from Kobe Steel, Ltd., and they were kneaded for five minutes to give a discharge temperature of about 150° C. and discharged (base kneading step).

To the kneaded mixture were added the sulfur and vulcanization accelerator in the amounts indicated in Table 2, and the mixture was kneaded in an open roll mill for about three minutes to give a discharge temperature of 80° C., thereby obtaining an unvulcanized rubber composition (final kneading step).

The unvulcanized rubber composition was press-vulcanized at 170° C. for 20 minutes to obtain a vulcanized rubber composition.

The vulcanized rubber compositions prepared as above were evaluated as described below. Table 2 shows the results.

(Rolling Resistance Index)

Specimens (vulcanized rubber sheets) of a predetermined size were cut out of the vulcanized rubber compositions. The loss tangent (tan δ) at 60° C. of the vulcanized rubber sheets was measured at an initial strain of 10%, a dynamic strain of 2%, and a frequency of 10 Hz using a viscoelastic spectrometer available from Ueshima Seisakusho Co., Ltd. The tan δ values are expressed as an index (rolling resistance index), with Comparative Example 1 set equal to 100. A higher index indicates better fuel economy.

(Abrasion Resistance Index)

Specimens of a predetermined size were cut out of the vulcanized rubber compositions. The Lambourn abrasion loss of the specimens was determined using a Lambourn abrasion tester at 20° C., a slip ratio of 20%, and a test time of 2 minutes. Then, a volume loss was calculated from the Lambourn abrasion loss. The volume loss of each formulation example is expressed as an index (abrasion resistance index), with Comparative Example 1 set equal to 100. A higher index indicates better abrasion resistance.

(Tire Vibration Property Index)

Specimens (vulcanized rubber sheets) of a predetermined size were cut out of the vulcanized rubber compositions. The loss coefficient (η) at 23° C. of the vulcanized rubber sheets was determined using a central vibration exciter available from B & K. The loss coefficient (η) of each formulation example is expressed as an index (tire vibration property index), with Comparative Example 1 set equal to 100. A higher index indicates better road noise-reducing properties (noise resistance).

TABLE 2

|  |  | Comparative Example | | | Example | |
| --- | --- | --- | --- | --- | --- | --- |
|  |  | 1 | 2 | 3 | 1 | 2 |
| Amount (parts by mass) | SBR | 80 | 80 | 80 | 80 | 80 |
|  | BR | 20 | 20 | 20 | 20 | 20 |
|  | Particle 1 | — | 20 | — | — | — |
|  | Particle 2 | — | — | 20 | — | — |
|  | Particle 3 | — | — | — | 20 | — |
|  | Particle 4 | — | — | — | — | 20 |
|  | Silica | 70 | 70 | 70 | 70 | 70 |
|  | Carbon black | 5 | 5 | 5 | 5 | 5 |
|  | Oil | 15 | 15 | 15 | 15 | 15 |
|  | Silane coupling agent | 5.6 | 5.6 | 5.6 | 5.6 | 5.6 |
|  | Wax | 2 | 2 | 2 | 2 | 2 |
|  | Antioxidant | 2 | 2 | 2 | 2 | 2 |
|  | Zinc oxide | 2.5 | 2.5 | 2.5 | 2.5 | 2.5 |
|  | Stearic acid | 2 | 2 | 2 | 2 | 2 |
|  | Sulfur | 2 | 2 | 2 | 2 | 2 |
|  | Vulcanization accelerator | 4 | 4 | 4 | 4 | 4 |
| Evaluation results | Rolling resistance index | 100 | 90 | 92 | 103 | 105 |
|  | Abrasion resistance index | 100 | 80 | 78 | 102 | 105 |
|  | Tire vibration property index | 100 | 50 | 55 | 160 | 200 |

Table 2 demonstrates that the rubber compositions of the examples which contained a core-shell structured particle (Particle 3 or 4) including a core having a melt viscosity at 38° C. of 0.1 to 3,000 Pa·s and a shell formed of a polymer of a conjugated diene compound and/or an aromatic vinyl compound exhibited improvements in all the properties including fuel economy, abrasion resistance, and road noise-reducing properties, and in particular the road noise-reducing properties were greatly improved.

The invention claimed is:

1. A pneumatic tire, comprising a tire component formed from a rubber composition for tires, the rubber composition comprising;
    a rubber component and
    a core-shell structured particle comprising a core and a shell,
    wherein
    the core has a melt viscosity at 38° C. of 0.1 to 3,000 Pa·s, and
    the shell is formed of a polymer of at least one of a conjugated diene compound or an aromatic vinyl compound.

2. The pneumatic tire according to claim 1, wherein the core is formed of at least one selected from the group consisting of a polymer of a compound represented by the following formula (1), a copolymer of a conjugated diene compound and an aromatic vinyl compound, a copolymer of a conjugated diene compound and a compound of formula (1), a copolymer of an aromatic vinyl compound and a compound of formula (1), and a copolymer of a conjugated diene compound, an aromatic vinyl compound, and a compound of formula (1),

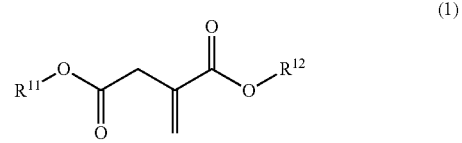

wherein $R^{11}$ and $R^{12}$ are the same or different and each represent a hydrogen atom or a $C_1$-$C_{30}$ hydrocarbon group.

3. The pneumatic tire according to claim 2, wherein the core-shell structured particle comprises, per 100% by mass thereof, 5% to 95% by mass of the core and 5% to 95% by mass of the shell.

4. The pneumatic tire according to claim 3, wherein the core-shell structured particle has an average particle size of 100 to 10,000 nm.

5. The pneumatic tire according to claim 4, wherein the rubber composition comprises, per 100 parts by mass of the rubber component therein, 1 to 50 parts by mass of the core-shell structured particle.

6. The pneumatic tire according to claim 5, wherein the rubber composition comprises at least one of carbon black or silica.

7. The pneumatic tire according to claim 1, wherein the core-shell structured particle comprises, per 100% by mass thereof, 5% to 95% by mass of the core and 5% to 95% by mass of the shell.

8. The pneumatic tire according to claim 1, wherein the core-shell structured particle has an average particle size of 100 to 10,000 nm.

9. The pneumatic tire according to claim 1, wherein the rubber composition comprises, per 100 parts by mass of the rubber component therein, 1 to 50 parts by mass of the core-shell structured particle.

10. The pneumatic tire according to claim 1, wherein the rubber composition comprises at least one of carbon black or silica.

* * * * *